June 24, 1941.  R. G. AREY  2,247,076

TUNING INSTRUMENT

Filed Aug. 25, 1939

Inventor:
Ralph G. Arey,
by Harry E. Dunham
His Attorney.

Patented June 24, 1941

2,247,076

UNITED STATES PATENT OFFICE 2,247,076

TUNING INSTRUMENT

Ralph G. Arey, Swampscott, Mass., assignor to General Electric Company, a corporation of New York Application August 25, 1939, Serial No. 291,878

8 Claims. (Cl. 116—114)

My invention relates to indicating instruments and is particularly useful in connection with radio tuning instruments to give a visual indication of the process of tuning and of the tuned condition when obtained.

My invention, however, is not limited to use as a tuning indicator.

It is an object of my invention to provide an improved current-responsive indicator of the shadow type having a light source and means for producing movable illuminated forms or indicia. A further object of my invention is to provide such an indicator which is not sensitive to changes in position of a lamp used as a light source or to changes in the shape of the lamp filament. Other and further objects and advantages will become apparent as the description proceeds.

The present invention relates to a modification of the devices disclosed in my Patents 2,058,939 and 2,014,960 both assigned to the same assignee as the present application. The indication is produced by the passage of certain forms across a translucent screen or a lens or by the coming to rest of these forms. A wide variety of effects may be obtained by changes in the size, shape, color, etc. of the image producing means.

Figure 1:
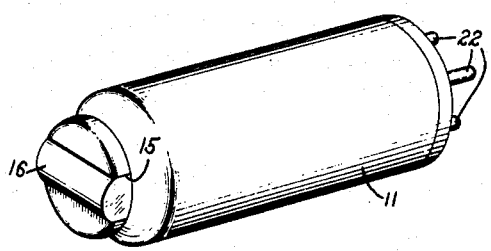
Figure 2:
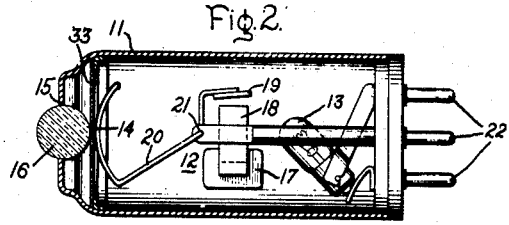
Figure 3:
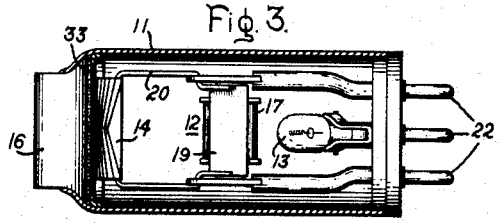

My invention will be understood more readily from the following detailed description when considered in connection with the accompanying drawing and those features of the invention which are believed to be novel and patentable will be pointed out in the claims appended hereto. In the drawing Figure 1 is a perspective view of an embodiment of my invention. Figure 2 is a side elevation of the apparatus of Figure 1 with an enclosing casing and certain other parts cut away and shown in longitudinal vertical section, and Figure 3 is a top view of the mechanism shown in Figure 2 with the instrument casing shown in longitudinal horizontal section. Figures 4a to 9a, inclusive, illustrate various designs which may be marked upon the movable shutter of the instrument and Figures 4b to 9b, inclusive, illustrate the visual effect on the translucent screen or lens of the instrument. Like reference characters are utilized throughout the drawing to designate like parts.

The instrument illustrated in the drawing comprises a tubular casing 11 enclosing a current-responsive unit 12, a lamp 13, and a movable shutter or target 14 operated by the current-responsive unit 12. The front end of the casing 11 may have an opening 15 closed by a translucent screen which may be in the form of a lens 16. As there is need for relatively small angular movement, of the order of five degrees, for example, the current-responsive unit 12 may be of a simple type comprising a current conducting field coil 17 having a core with pole pieces 18 and a pivoted armature 19 cooperating with the pole pieces 18. The movable armature 19 may be gravitationally biased to a position separated from the pole pieces 18 by means of an arm 20 attached to a movable member including the armature 19 and having a pivot point 21. The shutter 14 may be carried by the arm 20 and is preferably in the form of a portion of a cylindrical surface having a radius substantially equal to the distance between the pivot point 21 and the back surface of the lens 16. The shutter 14 carries certain indicia or marks which will be explained more in detail hereinafter. They may be in the form of opaque lines drawn upon a curved sheet of transparent or translucent material, so as to form the shutter 14, but my invention obviously is not limited to the precise arrangement illustrated and described. If desired, contact pins 22 may be provided at the back end of the casing 11 for making connections to a current source for energizing the lamp 13 and to an electrical circuit carrying the current which is to be indicated by the unit 12. For convenience the contact pins 22 may, if desired, be of such size and spacing as to fit in a socket, such as those used as radio tube sockets. In this manner the instrument 11 is readily removable and replaceable.

It will be understood that the lamp 13 illuminates the shutter and casts a shadow of any opaque markings of the shutter 14 onto the translucent member 16. The lamp thus causes such markings to be more clearly visible if the shutter 14 is viewed through the member 16. The member 16 may be either merely translucent, or clear and transparent according to the effect desired, and for the purpose of producing special effects or increasing the apparent extent or speed of motion of the markings on the shutter 14, the member 16 may be of such a character as to produce optical distortion, that is, produce refraction of light beams in one direction but not in the other, and may, for example, be in the form of a cylindrical lens, as shown. The lens 16 has its cylindrical or longitudinal axis transverse to the path of motion of the shutter 14, and in the arrangement shown the cylindrical axis is substantially perpendicular to the path of motion of the shutter. I have used the term "cylindrical axis" in the description and claims to designate the axis extending lengthwise of the lens 16 and parallel to the elements of the cylindrical surface thereof. The path of motion of the shutter 14 is substantially perpendicular also to the line of sight through the lens 16, the shutter 14, the markings thereon and the lamp 13, and the path of motion intersects a plane through the said line of sight and the cylindrical axis of the cylindrical lens. Furthermore, the said cylindrical axis of the lens is substantially perpendicular to the said line of sight. In the arrangement shown in the drawing there are three mutually perpendicular lines representing respectively, the cylindrical axis of the lens, the line of sight through the lens, shutter and light source, and the tangent to the circular path of the shutter at the point where this path of motion intersects the said line of sight. Since the angle of deflection of the shutter is so short, the arc representing its path of motion may be considered as substantially identical with the said tangent. Although the most marked effect is obtained by having the said three lines mutually perpendicular, it will be understood that in a somewhat lessened degree the same effect is obtained so long as each of the three lines is transverse to each of the other two, that is, each intersects the plane through the other two at a fairly large angle.

Figure 4A:
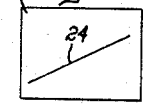
Figure 4B:
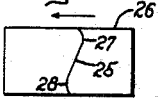

The effect of the use of such a cylindrical lens arranged as shown is illustrated in Figures 4a and 4b to 9a and 9b. For example, if a single diagonal line 24 is drawn upon the transparent or translucent shutter 14, a development of which 23 is represented in Figure 4a, the image of the straight line 24 will be distorted by the cylindrical lens 16 so as to produce a wavy line 25, as shown in Figure 4b, which is a view of the lens 16 as seen by looking at the front end of the instrument casing. This distortion takes place because light beams passing through the lens 16 are variably refracted transverse to the cylindrical or longitudinal axis of the cylindrical lens 16 but are not refracted in a plane including the cylindrical or longitudinal axis of the cylindrical lens. I use the term "refraction" in this case to mean lack of parallelism between the direction of a light beam before entering the lens and after emerging therefrom. Variations in current flowing in the coil 17, of course, produce motion of the armature 19 which causes up and down motion of the shutter 14, and of the diagonal line 24 carried upon the shutter 14. The wavy line 25 actually seen by the person observing the instrument, however, will not move up and down, but to the right and to the left. This results from the fact that the portion of the line 24 which intersects the horizontal plane through the center of the cylinder 16 actually moves to the right or to the left as the line 24 moves up and down. The directions of motion are represented by the arrows shown in Figures 4a and 4b. Upward motion of the line 24 and of the shutter 14 will appear as motion toward the left end of the wavy line 25, which is the image seen by the observer. If the line 24 were so drawn as to slant downward to the right instead of downward to the left, the direction of motion of the image 25 would, of course, be reversed and the relative position of the nodes 27 and 28 would also be reversed.

Figure 5A:
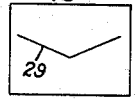
Figure 5B:
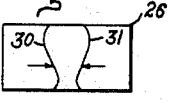
Figure 6A:
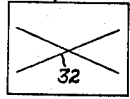
Figure 6B:
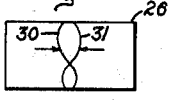

It will be understood that Figures 4a and 4b are merely illustrative of one effect which may be produced and that other effects may be produced by providing different designs on the shutter 14. For example, as illustrated in Figure 5a a shallow V-shaped mark 29 may be drawn on the translucent shutter 14 in which case a pair of wavy images 30 and 31 will be produced. As the mark 29 is moved upwards the images in Figure 5b will move toward each other, that is, image 30 will move to the right and image 31 will move to the left until they come in contact. Using a mark 32 in the shape of a relatively flat cross as shown in Figure 6a, similar images 30 and 31 will be produced, as shown in Figure 6b, and these may be made to appear from the ends of a rectangle 26, to approach and cross each other, and go beyond each other to the opposite ends of the rectangle 26 as the cross mark 32 is moved up and down through the center position. The more gradual the slope of the diagonal lines, such as the line 24, the greater the speed of motion of the image for a given speed of the instrument armature 19.

The instrument may be used in various manners for indicating tuning of radio receivers or for other purposes, and the precise method of use is not involved in my present invention. It will be understood, however, that the arrangement may be such that the presence of the image 26 or the images 30 and 31 at a predetermined position on the translucent screen 16 represents either maximum or minimum current corresponding to a tuned condition of a radio receiver according to its design. On the other hand, the arrangement may be such that the tuned condition of a radio receiver or other current indication to be produced is represented by the images coming to a stop after having been moving. The behavior of radio receivers with tuning indicators is explained more in detail in my Patents 2,058,939 and 2,014,960, respectively.

If desired, instead of making the lens 16 of translucent material I may provide a translucent screen 33 interposed between the front surface of the shutter 14 and the back surface of the lens 16. Additional effects may be produced by arranging the screen 33 in the form of a color filter, or by producing index markings on the front or back of the lens 16. If desired, additional effects may also be produced by the use of contrasting colors for the screen 33, the lens 16, the translucent shutter 14 and the markings thereon, or by the use of suitable colors for any one or more of these elements.

Figure 7A:
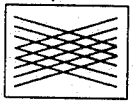
Figure 7B:
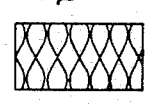

Still other effects may be produced by means of more complicated designs on the shutter 14. For example, as shown in Figure 7a, if two sets of parallel diagonal lines crossing each other are employed, there will appear in the lens 16 two sets of curved images (Fig. 7b) which travel from left to right in opposite directions appearing to cross each other successively as the shutter 14 is moved up and down with variations in current in the unit 12.

Figure 8A:
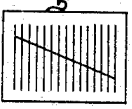
Figure 8B:

If a set of vertical lines and a single diagonal line is marked upon the translucent shutter 13, as shown in Figure 8a, there will appear an image as shown in Figure 8b composed of substantially stationary vertical lines with a sinuous line moving to the right and left crossing the vertical lines, which serve to intensify the perception of motion and provide a standard of reference for the moving line.

Figure 9A:
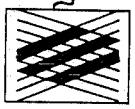
Figure 9B:

As shown in Figure 9a, the use of a set of broad diagonal markings crossed by a set of narrow diagonal markings produces an interesting image, shown in Figure 9b, in which the broad and narrow sinuous curves move in opposite directions crossing each other as the shutter 14 is moved. The designs illustrated in Figures 7a and 9a particularly also produce the illusion of depth in the images actually produced.

Although I prefer to provide a light source in the form of a lamp 13 rather than to rely upon external illumination and observance of the curved plate 14 through the lens 16 by reflected light, it will be understood that my invention is not limited to the precise arrangement illustrated.

The lens 16 may be composed of any suitable transparent or translucent material, such as glass or quartz, for example, or a suitable synthetic material, such as a polymerized methyl methacrylate of the type known by the tradenames Plexiglass and Pontalite, for example.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An instrument comprising in combination, a source of light, a movable light-transmitting member carrying a diagonal opaque marking and a cylindrical lens, said member being interposed between said light source and said lens, the cylindrical axis of the lens being transverse to the line of sight through the light source, light-transmitting member and lens, and transverse to the direction of motion of the said light-transmitting member, whereby the lens produces an image of the mark which appears to travel in a direction transverse to the actual direction of motion of the light transmitting member.

2. An instrument comprising in combination, a source of light, a movable light-transmitting member carrying diagonal crossing opaque markings and a cylindrical lens, said movable light transmitting member being interposed between said light source and said lens, the cylindrical axis of the lens being transverse to the line of sight through the light source, light-transmitting member and lens, and transverse to the direction of motion of the said light-transmitting member, whereby images are produced in said lens which appear to approach and recede one another moving transversely to the actual direction of motion of the light transmitting member.

3. An instrument comprising an optical member movable along a predetermined path and carrying diagonal markings contrasting with the background, and a distorting lens in front of said optical member, said lens being shaped to produce refraction transverse to a given line referred to as an axis, but substantially no refraction in a plane including said axis, said axis being transverse to the line of sight through the distorting lens and the optical member and transverse also to the actual path of motion of the optical member, whereby images are produced in said lens which differ in speed or direction of motion from the speed or direction of motion of the optical member.

4. An instrument which comprises a movable optical member having diagonal markings thereon contrasting with the background, a cylindrical lens in front of said optical member and means for illuminating the optical member, the cylindrical axis of the lens being transverse to the line of sight through the lens and the optical member and transverse also to the path of motion of the optical member, whereby images are produced in said lens which appear to travel in a direction of motion transverse to the actual direction of motion of the movable member.

5. An instrument comprising in combination, a source of light, a movable member carrying a translucent shutter with an opaque index marked thereon, and a cylindrical lens, said shutter being interposed between said light source and said lens, the cylindrical axis of the lens being transverse to the line of sight through the light source, shutter and lens, and transverse to the direction of motion of the index.

6. An instrument comprising in combination, a source of light, a movable member carrying a translucent shutter with an opaque index marked thereon, and a distorting lens of greater length than width shaped to produce refraction transverse to a given lengthwise line through the lens referred to as its axis but substantially no refraction in a plane including said axis, said shutter being interposed between said light source and said lens, said lens extending transversely to the direction of motion of the index, as well as extending transversely to the line of sight through the light source, shutter and lens.

7. An instrument comprising in combination, a source of light, a movable light-transmitting member carrying opaque markings, and a distorting lens shaped to produce refraction transverse to a given line through the lens referred to as its axis but substantially no refraction in a plane including said axis, said movable member being interposed between said light source and said lens, the said axis of the lens extending transversely to the direction of motion of the light-transmitting member, as well as extending transversely to the line of sight through the light source, light-transmitting member and lens.

8. An instrument comprising, a source of light, an indicator member, and a cylindrical lens, said member being light-transmitting and including an opaque line interposed between said light source and said lens, said line deviating from parallelism with either the cylindrical axis of said lens or the path of motion of the indicator member, the cylindrical axis of the lens being transverse to the line of sight through the lens and the source of light, and transverse also to the path of motion of the indicator member, said path of motion intersecting the plane through the cylindrical axis of the cylindrical lens and the said line of sight.

RALPH G. AREY.